(12) United States Patent
Liu et al.

(10) Patent No.: US 11,233,600 B2
(45) Date of Patent: Jan. 25, 2022

(54) WIRELESS COMMUNICATION METHOD, EVOLVED NODEB AND USER EQUIPMENT

(71) Applicant: ZTE CORPORATION, Guangdong (CN)

(72) Inventors: Ruihong Liu, Guangdong (CN); Guoqiang Zheng, Guangdong (CN); Shengnan Chen, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 143 days.

(21) Appl. No.: 16/628,018

(22) PCT Filed: Jun. 28, 2018

(86) PCT No.: PCT/CN2018/093352
§ 371 (c)(1),
(2) Date: Dec. 31, 2019

(87) PCT Pub. No.: WO2019/007255
PCT Pub. Date: Jan. 10, 2019

(65) Prior Publication Data
US 2020/0220651 A1    Jul. 9, 2020

(30) Foreign Application Priority Data
Jul. 3, 2017    (CN) .......................... 201710532406.8

(51) Int. Cl.
*H04L 1/00*    (2006.01)
*H04W 24/02*    (2009.01)
(Continued)

(52) U.S. Cl.
CPC .......... *H04L 1/0026* (2013.01); *H04L 1/0003* (2013.01); *H04L 5/0053* (2013.01);
(Continued)

(58) Field of Classification Search
CPC ....... H04L 1/009; H04L 1/003; H04L 1/0026; H04L 1/0003; H04L 1/0025; H04W 72/08
See application file for complete search history.

(56) References Cited

U.S. PATENT DOCUMENTS 10,742,472 B1 *  8/2020  Van Nee ............... H04L 1/0058
2009/0129284 A1  5/2009  Jung et al.
(Continued)

FOREIGN PATENT DOCUMENTS

CN    101005339 A    7/2007
CN    101064701 A    10/2007
(Continued)

OTHER PUBLICATIONS

WIPO, International Search Report dated Aug. 22, 2018.
(Continued)

*Primary Examiner* — Diane L Lo
*Assistant Examiner* — Abusayeed M Haque
(74) *Attorney, Agent, or Firm* — Houtteman Law LLC (57) ABSTRACT

Provided in the embodiments of the present disclosure are a wireless communication method, an evolved NodeB and a user equipment, wherein the evolved NodeB receives channel quality of a sub-band sent from the user equipment, the sub-band being a partial bandwidth divided from a system bandwidth, and the evolved NodeB determines a modulation and/or coding scheme adopted by the sub-band, and sends indication information carrying the modulation and/or coding scheme adopted by the sub-band to the user equipment.

17 Claims, 6 Drawing Sheets

(51) Int. Cl.
*H04W 72/08* (2009.01)
*H04L 5/00* (2006.01)
*H04W 72/04* (2009.01)

(52) U.S. Cl.
CPC ......... *H04W 24/02* (2013.01); *H04W 72/042* (2013.01); *H04W 72/08* (2013.01)

(56) References Cited

U.S. PATENT DOCUMENTS

| | | | |
|---|---|---|---|
| 2010/0080176 A1 | 4/2010 | Maas et al. | |
| 2011/0319068 A1 | 12/2011 | Kim et al. | |
| 2013/0215831 A1* | 8/2013 | Pang | H04W 76/27 370/328 |
| 2015/0065108 A1 | 3/2015 | Bedekar et al. | |
| 2015/0312929 A1 | 10/2015 | Kwon et al. | |
| 2015/0381328 A1 | 12/2015 | Mo et al. | |
| 2018/0183909 A1* | 6/2018 | Cariou | H04L 69/324 |
| 2018/0323835 A1* | 11/2018 | Wang | H04L 5/0057 |
| 2019/0013848 A1* | 1/2019 | Xiong | H04L 5/005 |
| 2019/0215133 A1* | 7/2019 | Pan | H04W 72/0446 |
| 2019/0274092 A1* | 9/2019 | Zhou | H04W 48/10 |
| 2019/0288797 A1* | 9/2019 | Guan | H04L 1/1671 |
| 2020/0092856 A1* | 3/2020 | Horiuchi | H04W 72/042 |
| 2020/0100219 A1* | 3/2020 | Takeda | H04L 5/0053 |

FOREIGN PATENT DOCUMENTS

| | | |
|---|---|---|
| CN | 101296009 A | 10/2008 |
| CN | 101674149 A | 3/2010 |
| CN | 101729114 A | 6/2010 |
| CN | 101827389 A | 9/2010 |
| CN | 101841386 A | 9/2010 |
| CN | 102111885 A | 6/2011 |
| CN | 102468920 A | 5/2012 |
| CN | 103168434 A | 6/2013 |
| CN | 104618928 A | 5/2015 |
| CN | 106304343 A | 1/2017 |
| EP | 2983406 A1 | 2/2016 |

OTHER PUBLICATIONS

China Patent Office, First Office Action dated Mar. 1, 2021 for application No. CN201710532406.8.

The extended European search report dated Feb. 2, 2021 for application No. EP18827640.6.

\* cited by examiner

WIRELESS COMMUNICATION METHOD, EVOLVED NODEB AND USER EQUIPMENT

TECHNICAL FIELD

The present disclosure relates to the field of communications, and in particular to a wireless communication method, an evolved NodeB, and a user equipment.

BACKGROUND

In the 3rd Generation Partnership Project (3GPP), for a scheduling mode of the 4th Generation Long Term Evolution (4G LTE), only one modulation and/or coding scheme is adopted regarding the same User Equipment (UE) and the same Transport Block (TB) regardless of situations of the channel and the occupied bandwidth. Thus, when the UE occupies a wider frequency band and the channel becomes frequency-selective fading, the same modulation and/or coding scheme adopted in the whole bandwidth range cannot achieve the maximum utilization rate. With the advancement of the 5th Generation (5G), larger bandwidth scenarios have become the mainstream, and disadvantages of continuously using the above scheduling mode become more obvious.

SUMMARY

In an embodiment of the present disclosure, there is provided a wireless communication method, including: receiving channel quality of a sub-band sent from a user equipment, the sub-band being a partial bandwidth divided from a system bandwidth; determining a modulation and/or coding scheme adopted by the sub-band; and sending indication information carrying the modulation and/or coding scheme to the user equipment.

In an embodiment of the present disclosure, there is further provided a wireless communication method, including: measuring and calculating channel quality of a sub-band, and sending the result to an evolved NodeB, the sub-band being a partial bandwidth divided from a system bandwidth; and receiving indication information carrying a modulation and/or coding scheme adopted by the sub-band sent from the evolved NodeB.

In an embodiment of the present disclosure, there is further provided an evolved NodeB, including: a first receiving module configured to receive channel quality of a sub-band sent from a user equipment, the sub-band being a partial bandwidth divided from a system bandwidth; a determining module configured to determine a modulation and/or coding scheme adopted by the sub-band; and a first sending module configured to send indication information carrying the modulation and/or coding scheme to the user equipment.

In an embodiment of the present disclosure, there is further provided a user equipment, including: a measuring module configured to measure and calculate channel quality of a sub-band, the sub-band being a partial bandwidth divided from a system bandwidth; a second sending module configured to send the channel quality of the sub-band to an evolved NodeB; and a second receiving module configured to receive indication information carrying a modulation and/or coding scheme adopted by the sub-band sent from the evolved NodeB.

In an embodiment of the present disclosure, there is further provided a computer storage medium storing a computer executable instruction, the computer executable instruction is executed to perform the wireless communication method as described above.

DETAILED DESCRIPTION

Embodiments of the present disclosure will be described in further detail with reference to the following detailed description and accompanying drawings.

Figure 1:
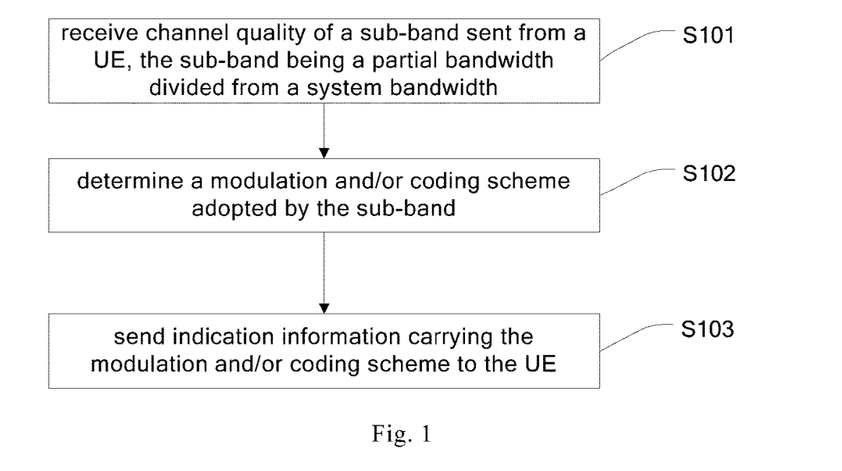
FIG. 1 is a flowchart of a wireless communication method at an evolved NodeB (eNodeB) side according to an embodiment of the present disclosure.

In an embodiment of the present disclosure, there is provided a wireless communication method at an eNodeB side. FIG. 1 is a flowchart of the wireless communication method at the eNodeB side according to the embodiment. As shown in FIG. 1, the wireless communication method includes the following steps S101 to S103.

At S101, channel quality of a sub-band sent from a UE is received, the sub-band being a partial bandwidth divided from a system bandwidth.

Specifically, the UE measures and calculates the channel quality of the sub-band, and sends the results to the eNodeB. The channel quality may be CQI, or other parameters that can reflect the channel quality.

The eNodeB may receive the channel quality of part of the sub-bands sent from the UE, or may receive the channel quality of all sub-bands sent from the UE, which may be specifically determined according to actual needs of services.

In some implementations, the wireless communication method further includes: dividing a system bandwidth into a plurality of sub-bands before the step S101.

Figure 2:
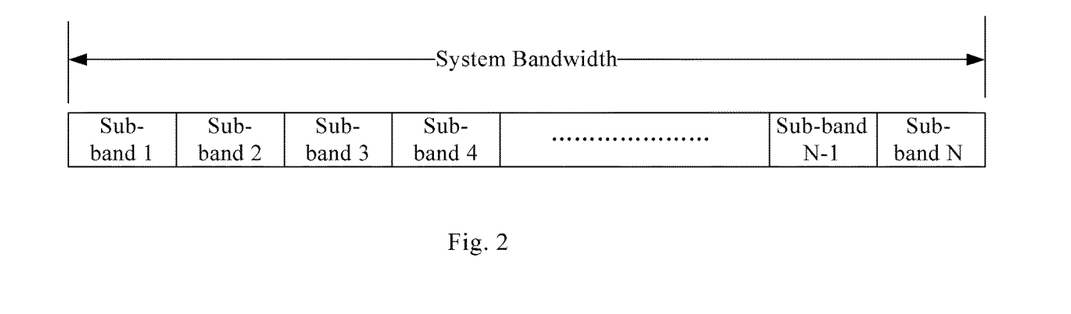
FIG. 2 is a schematic diagram of a sub-band division mode according to an embodiment of the present disclosure.

Specifically, the sub-band division is performed on full-bandwidth RBs. FIG. 2 is a schematic diagram of a sub-band division mode according to the embodiment. As shown in FIG. 2, the total system bandwidth may be divided into N sub-bands which are respectively labeled as sub-band 1, sub-band 2, sub-band 3, sub-band 4 . . . , sub-band N−1, and sub-band N.

In some implementations, the number of the plurality of sub-bands divided in the system bandwidth is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the number of sub-bands divided in the system bandwidth may also be re-determined according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

In some implementations, the wireless communication method further includes: notifying, by the eNodeB after dividing the system bandwidth into a plurality of sub-bands and before the step S101, the UE of a sub-band division mode and effective time of the sub-band division, where the sub-band division mode includes the number of the divided sub-bands.

The UE makes a response according to the effective time of the sub-band division. Specifically, the step S101 is performed after the sub-band division becomes effective.

In some implementations, the step of notifying, by the eNodeB, the UE of the sub-band division mode and the effective time of the sub-band division includes: notifying, by the eNodeB, the UE of the sub-band division mode and the effective time of the sub-band division by means of a System Information Block (SIB), semi-persistent scheduling, or signaling.

For example, if the number of sub-bands is 25 and a granularity of the RB is relatively small, the eNodeB may redivide the system bandwidth into 10 sub-bands. Then, the eNodeB notifies the UE of the fact that the number of sub-bands is changed to 10 and the effective time of the division of the 10 sub-bands as a next frame information, and the UE measures and calculates the channel quality of the sub-band according to the new sub-band division (the system bandwidth divided into 10 sub-bands) in the next frame.

At S102, a modulation and/or coding scheme adopted by the sub-band is determined.

Specifically, the modulation and/or coding scheme adopted by the sub-band is determined according to the channel quality of the sub-band sent from the UE.

Upon receiving the channel quality of the N sub-bands sent from the UE, the eNodeB determines the modulation and/or coding schemes respectively adopted by the N sub-bands.

The modulation and/or coding scheme may be a MCS, a modulation scheme, or a coding scheme, as desired.

At S103, indication information carrying the modulation and/or coding scheme is sent to the UE.

Specifically, the eNodeB performs scheduling according to the measurement and calculation results from the UE on the channel quality of the sub-band, and selects the optimal modulation and/or coding scheme most suitable for each sub-band in units of sub-bands.

The indication information indicating the modulation and/or coding scheme adopted by the sub-band sent to the UE may include both indication information for a downlink channel and indication information for an uplink channel.

The eNodeB may send the indication information to the UE by Downlink Control Information (DCI) indication or signaling, or may send the indication information to the UE by other methods besides DCI indication or signaling.

When the eNodeB sends the indication information to the UE by DCI indication, the indication information may be sent to the UE in bits in the DCI.

According to the modulation and/or coding scheme adopted by the sub-band sent from the eNodeB, the UE may demodulate downlink data on the sub-band, and may send uplink data on the sub-band.

Specifically, the UE may parse the indication information sent from the eNodeB in the DCI according to agreed bits to obtain the modulation and/or coding scheme adopted by the sub-band, and demodulate downlink data on the sub-band according to the modulation and/or coding scheme adopted by the sub-band sent from the eNodeB.

For example, the UE demodulates the downlink data on each sub-band, combines the downlink data on all sub-bands into one TB, determines whether the TB can pass the check, and then feeds back the determination result to the eNodeB. As an example, if the TB passes the check, an ACKnowledgement (ACK) is fed back to the eNodeB, and if the TB fails the check, a Negative ACKnowledgement (NACK) is fed back to the eNodeB.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation and/or coding scheme of a sub-band N. N is the maximum number of supported sub-bands.

Taking the maximum number of supported sub-bands in the system being 25 as an example, assuming that a binary code stream of the DCI is 01010 01001 01010 01011 01011 01011 01010 01001 01001 01000 01000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

With the technical solution of this embodiment, the same UE and the same TB may adopt different modulation and/or coding schemes.

With the technical solution of this embodiment, when the UE occupies a wider frequency band and the channel becomes frequency-selective fading, suitable modulation and/or coding schemes can be selected according to the channel condition to achieve the optimal modulation and demodulation effect and improve the spectrum utilization rate. Especially in a 5G large-bandwidth scenario where the channel quality varies greatly among sub-bands, by adopting the method of the embodiment, the data transmission rate is improved, and thus the frequency spectrum utilization rate is greatly improved.

Figure 3:
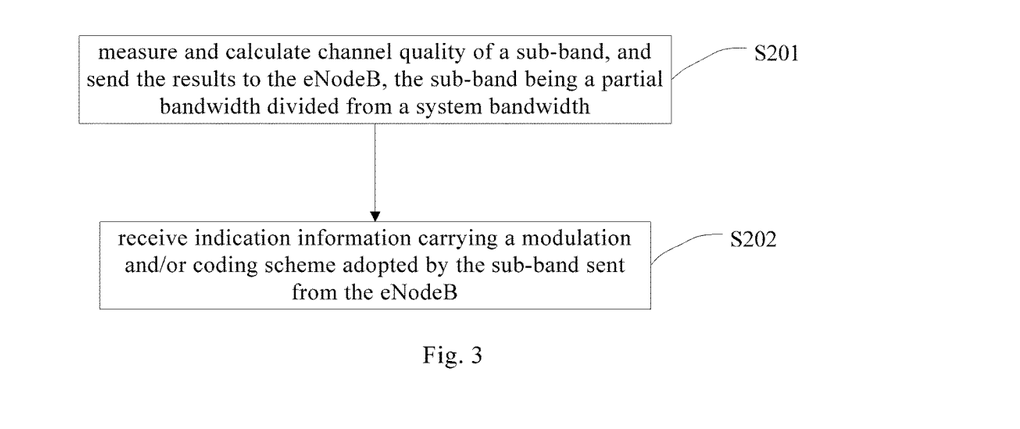
FIG. 3 is a flowchart of a wireless communication method at a UE side according to an embodiment of the present disclosure.

In an embodiment of the present disclosure, there is further provided a wireless communication method at a UE side. FIG. 3 is a flowchart of the wireless communication method at the UE side according to the embodiment. As shown in FIG. 3, the wireless communication method includes the following steps S201 and S202.

At S201, channel quality of a sub-band is measured and calculated, and the results are sent to the eNodeB, the sub-band being a partial bandwidth divided from a system bandwidth.

The channel quality may be CQI, or other parameters that can reflect the channel quality.

The UE may send the channel quality of part of the sub-bands to the eNodeB, or may send the channel quality of all sub-bands to the eNodeB, which may be specifically determined according to actual needs of services.

Specifically, the eNodeB performs sub-band division on full-bandwidth RBs. Referring again to FIG. 2, the total system bandwidth may be divided into N sub-bands which are respectively labeled as sub-band 1, sub-band 2, sub-band 3, sub-band 4 . . . , sub-band N−1, and sub-band N.

In some implementations, the number of the plurality of sub-bands divided in the system bandwidth by the eNodeB is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the eNodeB may redivide the number of sub-bands in the system bandwidth according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

In some implementations, the wireless communication method further includes: receiving a sub-band division mode and effective time of the sub-band division sent from the eNodeB before the step S201, where the sub-band division mode includes the number of the divided sub-bands.

The UE makes a response according to the effective time of the sub-band division. Specifically, the step S201 is performed after the sub-band division becomes effective.

In some implementations, the step of notifying, by the eNodeB, the UE of the sub-band division mode and the effective time of the sub-band division includes: notifying, by the eNodeB, the UE of the sub-band division mode and the effective time of the sub-band division by means of an SIB, semi-persistent scheduling, or signaling.

For example, if the number of sub-bands is 25 and a granularity of the RB is relatively small, the eNodeB may redivide the system bandwidth into 10 sub-bands. Then, the eNodeB notifies the UE of the fact that the number of sub-bands is changed to 10 and the effective time of the division of the 10 sub-bands as a next frame information, and the UE measures and calculates the channel quality of the sub-band according to the new sub-band division (the system bandwidth divided into 10 sub-bands) in the next frame.

At S202, indication information carrying a modulation and/or coding scheme adopted by the sub-band sent from the eNodeB is received.

Specifically, the eNodeB determines the modulation and/or coding scheme adopted by the sub-band according to the channel quality of the sub-band sent from the UE.

Upon receiving the channel quality of the N sub-bands sent from the UE, the eNodeB determines the modulation and/or coding schemes respectively adopted by the N sub-bands.

The modulation and/or coding scheme may be a MCS, a modulation scheme, or a coding scheme, as desired.

The wireless communication method further includes: after the step S202 and according to the modulation and/or coding scheme adopted by the sub-band sent from the eNodeB, demodulating downlink data on the sub-band, and sending uplink data on the sub-band.

In some implementations, the indication information indicating the modulation and/or coding scheme adopted by the sub-band sent from the eNodeB to the UE may include both indication information for a downlink channel and indication information for an uplink channel.

Specifically, the UE may parse the indication information sent from the eNodeB in the DCI according to agreed bits to obtain the modulation and/or coding scheme adopted by the sub-band, and demodulate downlink data on the sub-band according to the modulation and/or coding scheme adopted by the sub-band sent from the eNodeB.

For example, the UE demodulates the downlink data on each sub-band, combines the downlink data on all sub-bands into one TB, determines whether the TB can pass the check, and then feeds back the determination result to the eNodeB. As an example, if the TB passes the check, an ACK is fed back to the eNodeB, and if the TB fails the check, an NACK is fed back to the eNodeB.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation and/or coding scheme of a sub-band N. N is the maximum number of supported sub-bands.

Taking the maximum number of supported sub-bands in the system being 25 as an example, assuming that a binary code stream of the DCI is 01010 01001 01010 01011 01011 01011 01010 01001 01001 01000 01000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

In the technical solution of this embodiment, the same UE and the same TB adopt different modulation and/or coding schemes.

With the technical solution of this embodiment, when the UE occupies a wider frequency band and the channel becomes frequency-selective fading, suitable modulation and/or coding schemes can be selected according to the channel condition to achieve the optimal modulation and demodulation effect and improve the spectrum utilization rate. Especially in a 5G large-bandwidth scenario where the channel quality varies greatly among sub-bands, by adopting the method of the embodiment, the data transmission rate is improved, and thus the frequency spectrum utilization rate is greatly improved.

In an embodiment of the present disclosure, there is further provided a wireless communication method applied to a system including an eNodeB and a UE.

Figure 4:
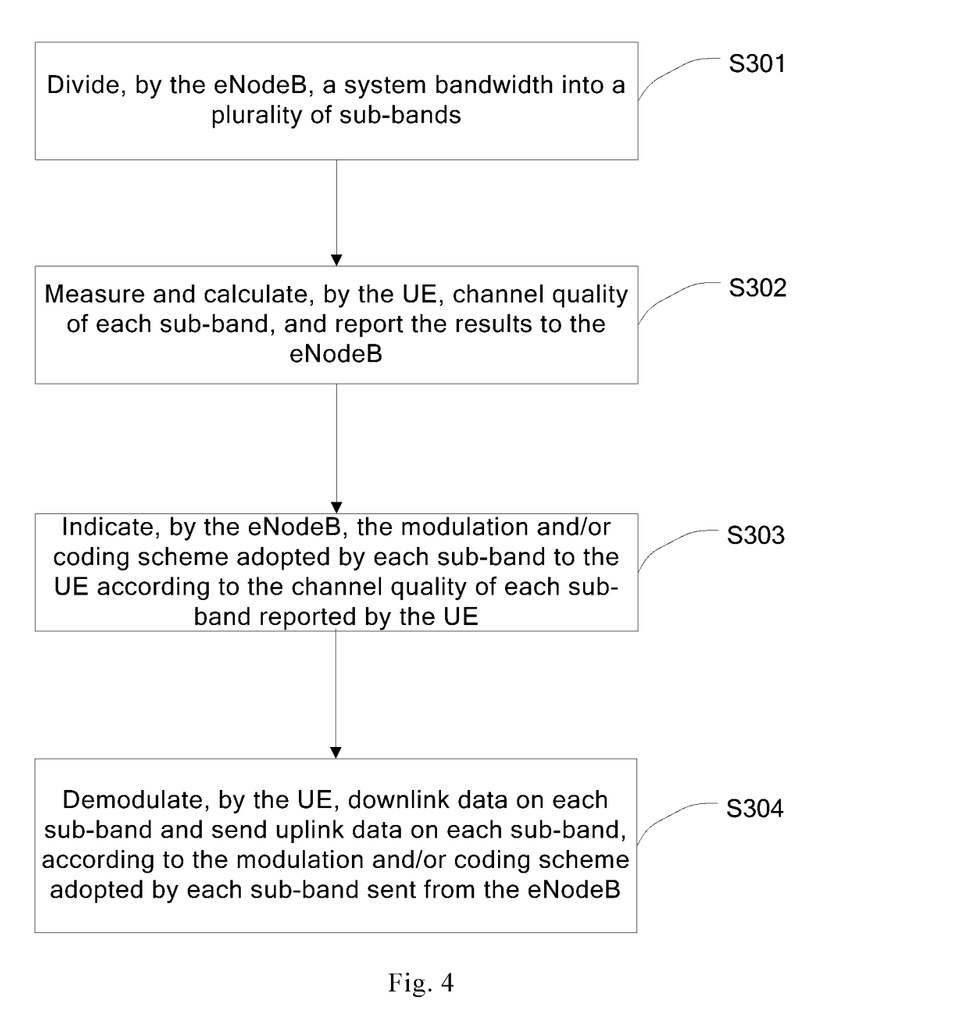
FIG. 4 is a flowchart of a wireless communication method applied to a system according to an embodiment of the present disclosure.

FIG. 4 is a flowchart of the wireless communication method applied to a system according to the embodiment. As shown in FIG. 4, the wireless communication method includes the following steps S301 to S304.

At S301, a system bandwidth is divided by the eNodeB into a plurality of sub-bands.

Specifically, the eNodeB performs sub-band division on full-bandwidth RBs. Referring again to FIG. 2, the total system bandwidth may be divided into N sub-bands which are respectively labeled as sub-band 1, sub-band 2, sub-band 3, sub-band 4 . . . , sub-band N−1, and sub-band N.

In some implementations, the number of the plurality of sub-bands divided in the system bandwidth by the eNodeB is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the number of sub-bands divided in the system bandwidth may also be re-determined according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

In some implementations, the wireless communication method further includes: notifying, by the eNodeB after the step S301, the UE of a sub-band division mode and effective time of the sub-band division, where the sub-band division mode includes the number of the divided sub-bands.

The UE makes a response according to the effective time of the sub-band division. Specifically, subsequent steps are performed after the sub-band division becomes effective.

In some implementations, the step of notifying, by the eNodeB, the UE of the sub-band division mode and the effective time of the sub-band division includes: notifying, by the eNodeB, the UE of the sub-band division mode and the effective time of the sub-band division by means of an SIB, semi-persistent scheduling, or signaling.

For example, if the number of sub-bands is 25 and a granularity of the RB is relatively small, the eNodeB may redivide the system bandwidth into 10 sub-bands. Then, the eNodeB notifies the UE of the fact that the number of sub-bands is changed to 10 and the effective time of the division of the 10 sub-bands as a next frame information, and the UE performs subsequent operations according to the new sub-band division (the system bandwidth divided into 10 sub-bands) in the next frame.

At S302, the UE measures and calculates channel quality of each sub-band, and reports the results to the eNodeB.

Specifically, the UE may measure and calculate the CQI of each sub-band and send it to the eNodeB.

At S303, the eNodeB sends indication information indicating the modulation and/or coding scheme adopted by each sub-band to the UE according to the channel quality of each sub-band reported by the UE.

Specifically, the eNodeB performs scheduling according to the channel quality of each sub-band reported by the UE, and selects the optimal modulation and/or coding scheme most suitable for each sub-band in units of sub-bands.

The indication information indicating the modulation and/or coding scheme adopted by each sub-band sent to the UE may include both indication information for a downlink channel and indication information for an uplink channel.

The eNodeB may send the indication information indicating the modulation and/or coding scheme adopted by each sub-band to the UE by DCI indication or signaling, or may send the indication information to the UE by other methods besides DCI indication or signaling.

At S304, the UE demodulates downlink data on each sub-band, and sends uplink data on each sub-band, according to the modulation and/or coding scheme adopted by each sub-band sent from the eNodeB.

In some implementations, the indication information indicating the modulation and/or coding scheme adopted by each sub-band sent from the eNodeB to the UE may include both indication information for a downlink channel and indication information for an uplink channel.

Specifically, the UE may parse the indication information sent from the eNodeB in the DCI according to agreed bits to obtain the modulation and/or coding scheme adopted by the sub-band, and demodulate downlink data on the sub-band according to the modulation and/or coding scheme adopted by the sub-band sent from the eNodeB.

For example, the UE demodulates the downlink data on each sub-band, combines the downlink data on all sub-bands into one TB, determines whether the TB can pass the check, and then feeds back the determination result to the eNodeB. As an example, if the TB passes the check, an ACK is fed back to the eNodeB, and if the TB fails the check, an NACK is fed back to the eNodeB.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation and/or coding scheme of a sub-band N. N is the maximum number of supported sub-bands.

Taking the maximum number of supported sub-bands in the system being 25 as an example, assuming that a binary code stream of the DCI is 01010 01001 01010 01011 01011 01011 01010 01001 01001 01000 01000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

In the technical solution of this embodiment, the same UE and the same TB adopt different modulation and/or coding schemes.

With the technical solution of this embodiment, when the UE occupies a wider frequency band and the channel becomes frequency-selective fading, suitable modulation and/or coding schemes can be selected according to the channel condition to achieve the optimal modulation and demodulation effect and improve the spectrum utilization rate. Especially in a 5G large-bandwidth scenario where the channel quality varies greatly among sub-bands, by adopting the method of the embodiment, the data transmission rate is improved, and thus the frequency spectrum utilization rate is greatly improved.

Figure 5:
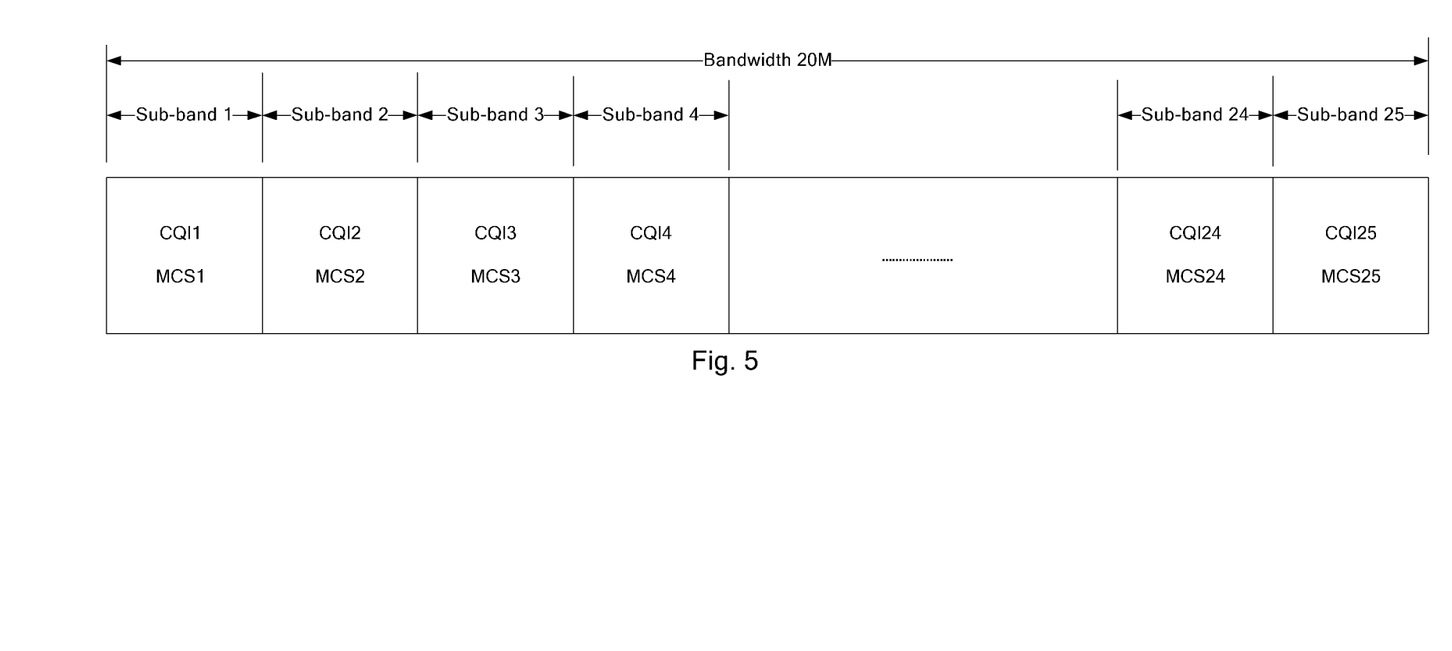
FIG. 5 is a schematic diagram showing determining, according to Channel Quality Indication (CQI) of each sub-band, a Modulation and Coding Scheme (MCS) adopted by the sub-band when a system bandwidth is 20M and a bandwidth of each sub-band is 4 Resource blocks (RBs), according to an embodiment of the present disclosure.

FIG. 5 is a schematic diagram showing determining, according to the CQI of each sub-band, a MCS adopted by the sub-band when a system bandwidth is 20M, with 100 RBs in total, and a bandwidth of each sub-band is 4 RBs, according to an embodiment of the present disclosure.

As shown in FIG. 5, in the case that the system bandwidth is 20M and the bandwidth of each sub-band is 4 RBs, the system bandwidth is divided into 25 sub-bands, which are respectively labeled as sub-band 1, sub-band 2, sub-band 3, sub-band 4 . . . , sub-band 24, and sub-band 25.

The UE may measure and calculate the CQI of each sub-band separately and report it to the eNodeB.

Specifically, the CQI of sub-band 1 is indicated as CQI1, the CQI of sub-band 2 is indicated as CQI2, the CQI of sub-band 3 is indicated as CQI3, the CQI of sub-band 4 is indicated as CQI4 . . . the CQI of sub-band 24 is indicated as CQI24, and the CQI of sub-band 25 is indicated as CQI25.

The eNodeB may determine the MCS respectively adopted by each sub-band according to the CQI of each sub-band reported by the UE, while indicating the MCSs adopted by the respective sub-bands in bits in the DCI.

As an example, the MCS adopted by the sub-band 1 is indicated as MCS1, the MCS adopted by the sub-band 2 is indicated as MCS2, the MCS adopted by the sub-band 3 is indicated as MCS3, the MCS adopted by the sub-band 4 is indicated as MCS4, . . . the MCS adopted by the sub-band 24 is indicated as MCS24, and the MCS adopted by the sub-band 25 is indicated as MCS25.

The UE may parse the indication information sent from the eNodeB in the DCI according to agreed bits to obtain the MCS adopted by the sub-band, and demodulate downlink data on each sub-band and send uplink data on each sub-band, according to the MCS adopted by the sub-band sent from the eNodeB.

In this embodiment, different sub-bands may adopt different MCSs, which greatly improves the spectrum utilization rate compared to the case where all sub-bands adopt the same MCS.

Figure 6:
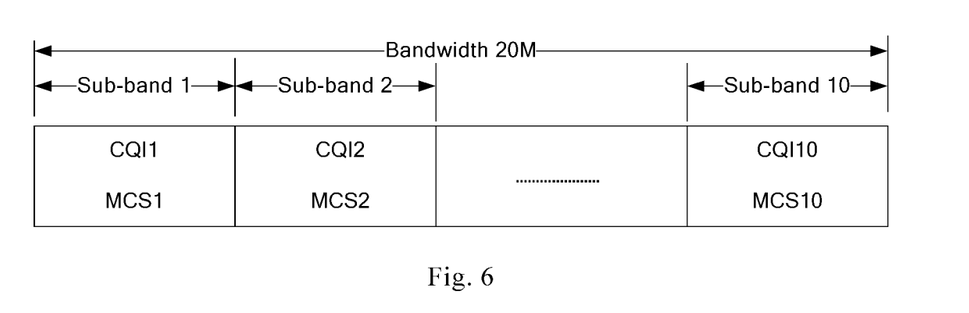
FIG. 6 is a schematic diagram showing determining, according to a CQI of each sub-band, a CMS adopted by the sub-band when a system bandwidth is 20M, a bandwidth of each sub-band is 10 RBs, according to an embodiment of the present disclosure.

The number of sub-bands of the system bandwidth may be re-determined in consideration of the continuity of interference and reducing overheads of control information. FIG. 6 is a schematic diagram showing determining, according to the CQI of each sub-band, a MCS adopted by the sub-band when a system bandwidth is 20M, with 100 RBs in total, and a bandwidth of each sub-band is 10 RBs, according to an embodiment of the present disclosure.

As shown in FIG. 6, in the case that the system bandwidth is 20M and the bandwidth of each sub-band is 10 RBs, the system bandwidth is divided into 10 sub-bands, which are respectively labeled as sub-band 1, sub-band 2 . . . and sub-band 10.

The UE may measure and calculate the CQI of each sub-band separately and report it to the eNodeB.

Specifically, the CQI of sub-band 1 is indicated as CQI1, the CQI of sub-band 2 is indicated as CQI2 . . . the CQI of sub-band 10 is indicated as CQI10.

The eNodeB may determine the MCS respectively adopted by each sub-band according to the CQI of each sub-band reported by the UE, while indicating the MCSs adopted by the respective sub-bands in bits in the DCI.

As an example, the MCS adopted by the sub-band 1 is indicated as MCS1, the MCS adopted by the sub-band 2 is indicated as MCS2 . . . the MCS adopted by the sub-band 10 is indicated as MCS10.

The UE may parse the indication information sent from the eNodeB in the DCI according to agreed bits to obtain the MCS adopted by the sub-band, and demodulate downlink data on each sub-band and send uplink data on each sub-band, according to the MCS adopted by the sub-band sent from the eNodeB.

In this embodiment, different sub-bands may adopt different MCSs, which greatly improves the spectrum utilization rate compared to the case where all sub-bands adopt the same MCS.

Figure 7:
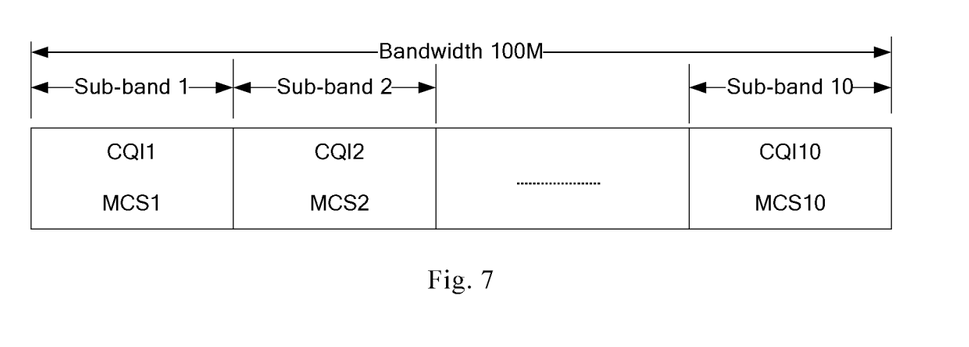
FIG. 7 is a schematic diagram showing determining, according to a CQI of each sub-band, a CMS adopted by the sub-band when a system bandwidth is 100M, a bandwidth of each sub-band is 30 RBs, according to an embodiment of the present disclosure.

FIG. 7 is a schematic diagram showing determining, according to the CQI of each sub-band, a MCS adopted by the sub-band when a system bandwidth is 100M with 300 RBs in total, and a bandwidth of each sub-band is 30 RBs, according to an embodiment of the present disclosure.

As shown in FIG. 7, in the case that the system bandwidth is 100M and the bandwidth of each sub-band is 30 RBs, the system bandwidth is divided into 10 sub-bands, which are respectively labeled as sub-band 1, sub-band 2 . . . and sub-band 10.

The UE may measure and calculate the CQI of each sub-band separately and report it to the eNodeB.

Specifically, the CQI of sub-band 1 is indicated as CQI1, the CQI of sub-band 2 is indicated as CQI2 . . . the CQI of sub-band 10 is indicated as CQI10.

The eNodeB may determine the MCS respectively adopted by each sub-band according to the CQI of each sub-band reported by the UE, while indicating the MCSs adopted by the respective sub-bands in bits in the DCI.

As an example, the MCS adopted by the sub-band 1 is indicated as MCS1, the MCS adopted by the sub-band 2 is indicated as MCS2 . . . the MCS adopted by the sub-band 10 is indicated as MCS10.

The UE may parse the indication information sent from the eNodeB in the DCI according to agreed bits to obtain the MCS adopted by the sub-band, and demodulate downlink data on each sub-band and send uplink data on each sub-band, according to the MCS adopted by the sub-band sent from the eNodeB.

Considering that the channel tends to become selective fading in larger bandwidth, in this embodiment, different sub-bands may adopt different MCSs, which greatly improves the spectrum utilization rate compared to the case where all sub-bands adopt the same MCS.

Figure 8:
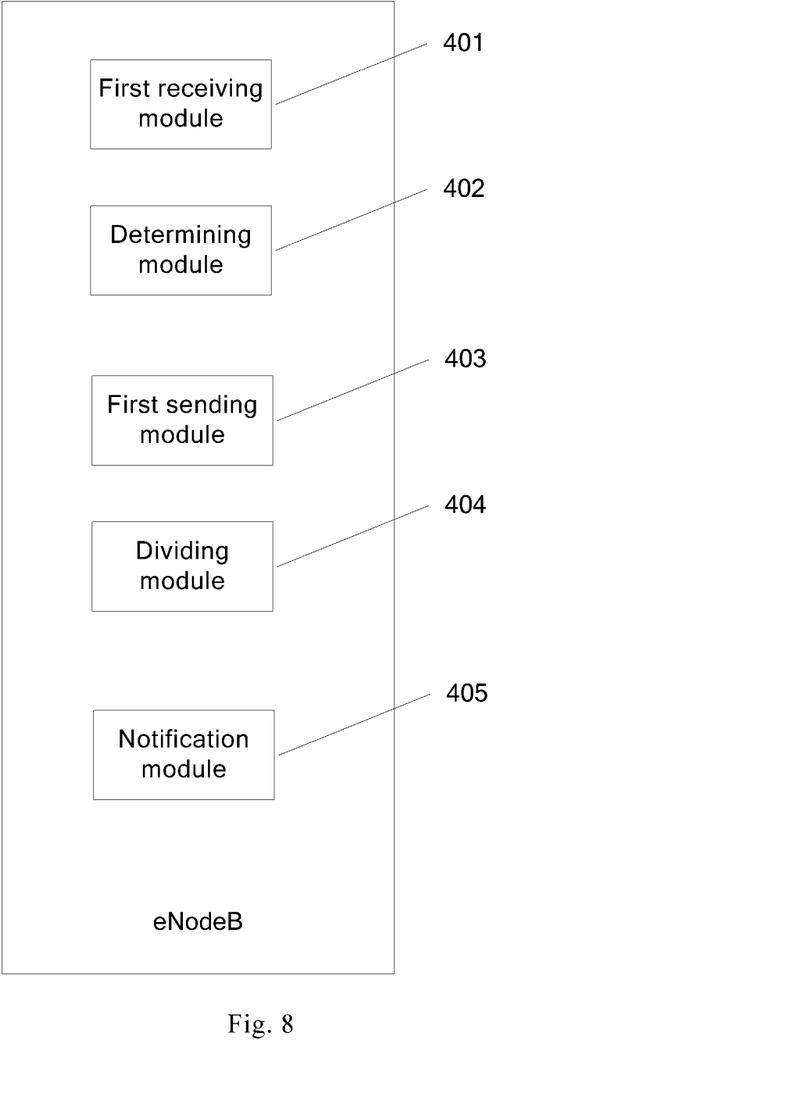
FIG. 8 is a schematic diagram of an eNodeB according to an embodiment of the present disclosure.

FIG. 8 is a schematic diagram of an eNodeB according to an embodiment of the present disclosure. As shown in FIG. 8, the eNodeB includes a first receiving module 401, a determining module 402, and a first sending module 403.

The first receiving module 401 is configured to receive channel quality of a sub-band sent from a UE. The sub-band is a partial bandwidth divided from a system bandwidth. The channel quality may be CQI, or other parameters that can reflect the channel quality.

Specifically, the channel quality of part of the sub-bands sent from the UE may be received, or the channel quality of all sub-bands sent from the UE may be received, which may be specifically determined according to actual needs of services.

In some implementations, the eNodeB further includes: a dividing module 404 configured to divide the system bandwidth into a plurality of sub-bands before the first receiving module 401 receives the channel quality of the sub-band sent from the UE.

Specifically, the sub-band division is performed on full-bandwidth RBs. Referring again to FIG. 2, the total system bandwidth may be divided into N sub-bands which are respectively labeled as sub-band 1, sub-band 2, sub-band 3, sub-band 4 . . . , sub-band N–1, and sub-band N.

In some implementations, the number of the plurality of sub-bands divided in the system bandwidth by the dividing module 404 is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the number of sub-bands divided in the system bandwidth may also be re-determined according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

In some implementations, the eNodeB further includes: a notification module 405 configured to notify, after the dividing module 404 divides the system bandwidth into a plurality of sub-bands and before the first receiving module 401 receives the channel quality of the sub-band sent from the UE, the UE of a sub-band division mode and effective time of the sub-band division, where the sub-band division mode includes the number of the divided sub-bands.

The UE makes a response according to the effective time of the sub-band division. Specifically, subsequent operations are performed after the sub-band division becomes effective.

In some implementations, the notification module 405 is configured to notify the UE of the sub-band division mode and the effective time of the sub-band division by means of an SIB, semi-persistent scheduling, or signaling.

For example, if the number of sub-bands is 25 and a granularity of the RB is relatively small, the dividing module 404 may redivide the system bandwidth into 10 sub-bands. Then, the notification module 405 notifies the UE of the fact that the number of sub-bands is changed to 10 and the effective time of the division of the 10 sub-bands as a next frame information, and the UE performs subsequent operations according to the new sub-band division (the system bandwidth divided into 10 sub-bands) in the next frame.

The determining module 402 is configured to determine a modulation and/or coding scheme adopted by the sub-band.

Specifically, the modulation and/or coding scheme adopted by the sub-band is determined according to the channel quality of the sub-band sent from the UE.

When the first receiving module 401 receives the channel quality of the N sub-bands sent from the UE, the determining module 402 determines the modulation and/or coding schemes respectively adopted by the N sub-bands.

The modulation and/or coding scheme may be a MCS, a modulation scheme, or a coding scheme, as desired.

The first sending module 403 is configured to send indication information carrying the modulation and/or coding scheme to the UE.

Specifically, the eNodeB performs scheduling according to the measurement and calculation results from the UE on the channel quality of the sub-band, and selects the optimal modulation and/or coding scheme most suitable for each sub-band in units of sub-bands.

The indication information indicating the modulation and/or coding scheme adopted by the sub-band sent to the UE may include both indication information for a downlink channel and indication information for an uplink channel.

The first sending module 403 may send the indication information to the UE by DCI indication or signaling, or may send the indication information to the UE by other methods besides DCI indication or signaling.

When the first sending module 403 sends the indication information to the UE by DCI indication, the first sending module 403 is configured to send the indication information to the UE in bits in the DCI.

According to the modulation and/or coding scheme adopted by the sub-band sent from the eNodeB, the UE may demodulate downlink data on the sub-band, and may send uplink data on the sub-band.

Specifically, the UE may parse the indication information sent from the eNodeB in the DCI according to agreed bits to obtain the modulation and/or coding scheme adopted by the sub-band, and demodulate downlink data on the sub-band according to the modulation and/or coding scheme adopted by the sub-band sent from the eNodeB.

For example, the UE demodulates the downlink data on each sub-band, combines the downlink data on all sub-bands into one TB, determines whether the TB can pass the check, and then feeds back the determination result to the eNodeB. As an example, if the TB passes the check, an ACK is fed back to the eNodeB, and if the TB fails the check, an NACK is fed back to the eNodeB.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation and/or coding scheme of a sub-band N. N is the maximum number of supported sub-bands.

Taking the maximum number of supported sub-bands in the system being 25 as an example, assuming that a binary code stream of the DCI is 01010 01001 01010 01011 01011 01011 01010 01001 01001 01000 01000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

With the technical solution of this embodiment, the same UE and the same TB may adopt different modulation and/or coding schemes.

With the technical solution of this embodiment, when the UE occupies a wider frequency band and the channel becomes frequency-selective fading, suitable modulation and/or coding schemes can be selected according to the channel condition to achieve the optimal modulation and demodulation effect and improve the spectrum utilization rate. Especially in a 5G large-bandwidth scenario where the channel quality varies greatly among sub-bands, by adopting the eNodeB of the embodiment, the data transmission rate is improved, and thus the frequency spectrum utilization rate is greatly improved.

Figure 9:
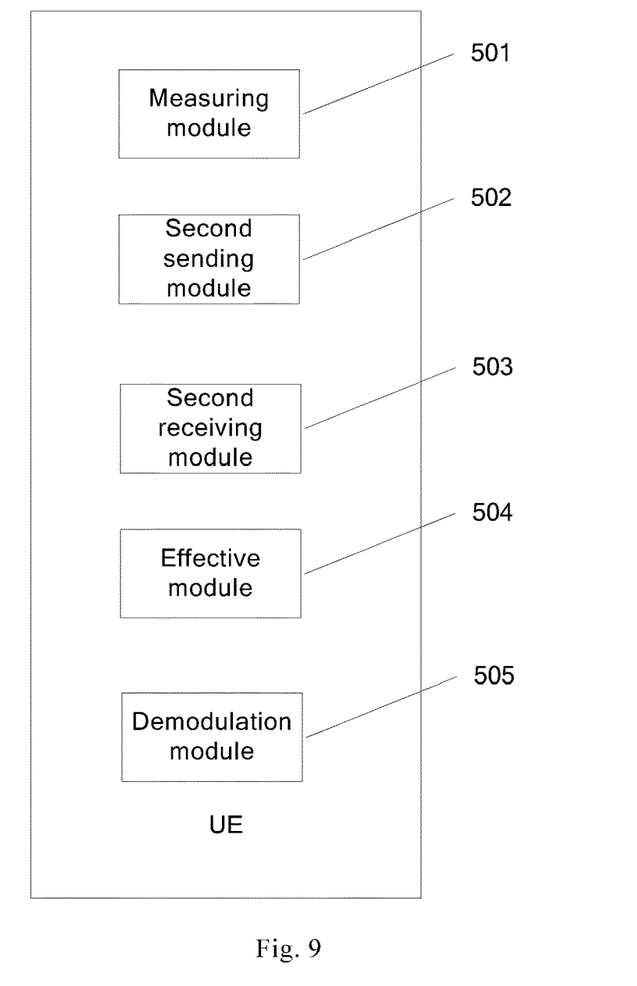
FIG. 9 is a schematic diagram of a UE according to an embodiment of the present disclosure.

FIG. 9 is a schematic diagram of a UE according to an embodiment of the present disclosure. As shown in FIG. 9, the UE includes a measuring module 501, a second sending module 502, and a second receiving module 503.

The measuring module 501 is configured to measure and calculate channel quality of a sub-band. The sub-band is a partial bandwidth divided from a system bandwidth. The channel quality may be CQI, or other parameters that can reflect the channel quality.

Specifically, the measuring module 501 measures and calculates the channel quality of sub-bands divided in the system bandwidth by the eNodeB.

The eNodeB performs sub-band division on full-bandwidth RBs. Referring again to FIG. 2, the total system bandwidth may be divided into N sub-bands which are respectively labeled as sub-band 1, sub-band 2, sub-band 3, sub-band 4 . . . , sub-band N–1, and sub-band N.

In some implementations, the number of the plurality of sub-bands divided in the system bandwidth by the eNodeB is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the eNodeB may redivide the number of sub-bands in the system bandwidth according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

The second sending module 502 is configured to send the channel quality of the sub-band to the eNodeB.

Specifically, the channel quality of part of the sub-bands may be sent to the eNodeB, or the channel quality of all sub-bands may be sent to the eNodeB, which may be specifically determined according to actual needs of services.

The second receiving module 503 is configured to receive indication information carrying a modulation and/or coding scheme adopted by the sub-band sent from the eNodeB.

Specifically, the eNodeB may determine the modulation and/or coding scheme adopted by the sub-band according to the channel quality of the sub-band sent from the UE.

Upon receiving the channel quality of the N sub-bands sent from the UE, the eNodeB determines the modulation and/or coding schemes respectively adopted by the N sub-bands.

The modulation and/or coding scheme may be a MCS, a modulation scheme, or a coding scheme, as desired.

In some implementations, the second receiving module 503 is further configured to receive a sub-band division mode and effective time of the sub-band division sent from the eNodeB before the measuring module 501 measures and calculates the channel quality of the sub-band, wherein the sub-band division mode includes the number of the divided sub-bands.

In some implementations, the UE further includes: an effective module 504 configured to control a response of the UE according to the effective time of the sub-band division.

Specifically, the effective module 504 may notify the measuring module 501 to start measuring and calculating the channel quality of the sub-band according to the effective time of the sub-band division.

In some implementations, the eNodeB notifies the UE of the sub-band division mode and the effective time of the sub-band division by means of an SIB, semi-persistent scheduling, or signaling.

For example, if the number of sub-bands is 25 and a granularity of the RB is relatively small, the eNodeB may redivide the system bandwidth into 10 sub-bands. Then, the eNodeB notifies the UE of the fact that the number of sub-bands is changed to 10 and the effective time of the division of the 10 sub-bands as a next frame information, and the UE measures and calculates the channel quality of the sub-band according to the new sub-band division (the system bandwidth divided into 10 sub-bands) in the next frame.

In some implementations, the UE further includes: a demodulation module 505 configured to demodulate, after the second receiving module 503 receives the indication information sent from the eNodeB, downlink data on the sub-band according to the modulation and/or coding scheme adopted by the sub-band sent from the eNodeB.

In some implementations, the second sending module 502 is configured to send, after the second receiving module 503 receives the indication information sent from the eNodeB, uplink data on the sub-band according to the modulation and/or coding scheme adopted by the sub-band sent from the eNodeB.

In some implementations, the indication information indicating the modulation and/or coding scheme adopted by the sub-band sent from the eNodeB to the UE may include both indication information for a downlink channel and indication information for an uplink channel.

Specifically, the demodulation module 505 may be configured to parse the indication information sent from the eNodeB in the DCI according to agreed bits to obtain the modulation and/or coding scheme adopted by the sub-band, and demodulate downlink data on the sub-band according to the modulation and/or coding scheme adopted by the sub-band sent from the eNodeB.

For example, the UE demodulates the downlink data on each sub-band, combines the downlink data on all sub-bands into one TB, determines whether the TB can pass the check, and then feeds back the determination result to the eNodeB. As an example, if the TB passes the check, an ACK is fed back to the eNodeB, and if the TB fails the check, an NACK is fed back to the eNodeB.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation and/or coding scheme of a sub-band N. N is the maximum number of supported sub-bands.

Taking the maximum number of supported sub-bands in the system being 25 as an example, assuming that a binary code stream of the DCI is 01010 01001 01010 01011 01011 01011 01010 01001 01001 01000 01000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

In the technical solution of this embodiment, the same UE and the same TB adopt different modulation and/or coding schemes.

With the technical solution of this embodiment, when the UE occupies a wider frequency band and the channel becomes frequency-selective fading, suitable modulation and/or coding schemes can be selected according to the channel condition to achieve the optimal modulation and demodulation effect and improve the spectrum utilization rate. Especially in a 5G large-bandwidth scenario where the channel quality varies greatly among sub-bands, by adopting the UE of the embodiment, the data transmission rate is improved, and thus the frequency spectrum utilization rate is greatly improved.

Figure 10:
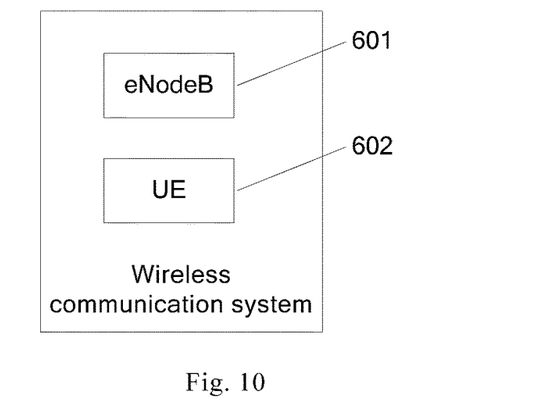
FIG. 10 is a schematic diagram of a wireless communication system according to an embodiment of the disclosure.

FIG. 10 is a schematic diagram of a wireless communication system according to an embodiment of the disclosure. As shown in FIG. 10, the wireless communication system includes the eNodeB 601 and the UE 602 of the above embodiments.

The eNodeB 601 is configured to divide a system bandwidth into a plurality of sub-bands. The UE 602 measures and calculates channel quality of each sub-band, and reports it to the eNodeB 601. Then, the eNodeB indicates the modulation and/or coding scheme adopted by each sub-band to the UE 602 according to the channel quality of each sub-band reported by the UE 602.

Specifically, the eNodeB performs sub-band division on full-bandwidth RBs. Referring again to FIG. 2, the total system bandwidth may be divided into N sub-bands which are respectively labeled as sub-band 1, sub-band 2, sub-band 3, sub-band 4 . . . , sub-band N−1, and sub-band N.

In some implementations, the number of sub-bands divided in the system bandwidth by the eNodeB 601 is the same as the number of sub-bands divided in a communication protocol (e.g., 3GPP protocol, 5G protocol, etc.).

For example, if the number of sub-bands divided in the communication protocol is 25, the system bandwidth in this embodiment may be divided into 25 sub-bands.

It will be appreciated that the number of sub-bands divided in the system bandwidth may also be re-determined according to system overheads.

For example, when the system bandwidth is 20M, with 100 RBs in total, each divided sub-band may have 4 RBs, so that the system bandwidth is divided into 25 sub-bands which require 25 MCSs, resulting in greater system overheads. However, if each divided sub-band has 10 RBs, the system bandwidth is divided into 10 sub-bands which require only 10 MCSs, thereby reducing the system overheads.

In some implementations, the eNodeB 601 is further configured to notify, after dividing the system bandwidth into a plurality of sub-bands and before the UE 602 measures and calculates the channel quality of each sub-band, the UE 602 of a sub-band division mode and effective time of the sub-band division, where the sub-band division mode includes the number of the divided sub-bands.

The eNodeB 601 is further configured to make a response according to the effective time of the sub-band division. Specifically, the step of measuring and calculating the channel quality of each sub-band is performed after the sub-band division becomes effective.

In some implementations, the eNodeB 601 is configured to notify the UE 602 of the sub-band division mode and the effective time of the sub-band division by means of an SIB, semi-persistent scheduling, or signaling.

For example, if the number sub-bands is 25 and a granularity of the RB is relatively small, the eNodeB 601 may redivide the system bandwidth into 10 sub-bands. Then, the eNodeB 601 notifies the UE 602 of the fact that the number of sub-bands is changed to 10 and the effective time of the division of the 10 sub-bands as a next frame information, and the UE 602 measures and calculates the channel quality of the sub-band according to the new sub-band division (the system bandwidth divided into 10 sub-bands) in the next frame.

The eNodeB 601 performs scheduling according to the measurement and calculation results from the UE 602 on the channel quality of the sub-band, selects the optimal modulation and/or coding scheme most suitable for each sub-band in units of sub-bands, and sends indication information carrying the modulation and/or coding scheme to the UE 602.

The indication information indicating the modulation and/or coding scheme adopted by the sub-band sent from the eNodeB 601 to the UE 602 may include both indication information for a downlink channel and indication information for an uplink channel.

The eNodeB 601 may send the indication information to the UE 602 by DCI indication or signaling, or may send the indication information to the UE 602 by other methods besides DCI indication or signaling.

According to the modulation and/or coding scheme adopted by each sub-band sent from the eNodeB 601, the UE 602 may demodulate downlink data on each sub-band, and may send uplink data on each sub-band.

Specifically, the UE 602 may parse the indication information sent from the eNodeB in the DCI according to agreed bits to obtain the modulation and/or coding scheme adopted by the sub-band, and demodulate downlink data on each sub-band according to the modulation and/or coding scheme adopted by the sub-band sent from the eNodeB.

For example, the UE 602 demodulates the downlink data on each sub-band, combines the downlink data on all sub-bands into one TB, determines whether the TB can pass the check, and then feeds back the determination result to the eNodeB 601. If the TB passes the check, an ACK is fed back to the eNodeB 601, and if the TB fails the check, an NACK is fed back to the eNodeB 601.

In addition, the UE may send uplink data on the sub-band according to the modulation and/or coding scheme adopted by the sub-band sent from the eNodeB.

Assume that bits in the DCI are defined as: 5 bits represent the number of sub-bands; 5 bits represent the modulation and/or coding scheme of a sub-band 1; 5 bits represent the modulation and/or coding scheme of a sub-band 2; . . . 5 bits represent the modulation coding scheme of a sub-band N. N is the maximum number of supported sub-bands.

Taking the maximum number of supported sub-bands in the system being 25 as an example, assuming that a binary code stream of the DCI is 01010 01001 01010 01011 01011

01011 01010 01001 01001 01000 01000 00000 00000 00000 00000 00000 00000 00000 00000 00000 00000 00000 00000 00000 00000 00000, it indicates that the system bandwidth is divided into 10 sub-bands (01010), a modulation and/or coding scheme adopted by a sub-band 1 is denoted as 9 (01001), a modulation and/or coding scheme adopted by a sub-band 2 is denoted as 10 (01010), a modulation and/or coding scheme adopted by a sub-band 3 is denoted as 11 (01011) . . . a modulation and/or coding scheme adopted by a sub-band 9 is denoted as 8 (01000), a modulation and/or coding scheme adopted by a sub-band 10 is denoted as 8 (01000), while other unoccupied sub-bands are not parsed.

In the technical solution of this embodiment, the same UE 602 and the same TB adopt different modulation and/or coding schemes.

With the technical solution of this embodiment, when the UE 602 occupies a wider frequency band and the channel becomes frequency-selective fading, suitable MCSs can be selected according to the channel condition to achieve the optimal modulation and demodulation effect and improve the spectrum utilization rate. Especially in a 5G large-bandwidth scenario where the channel quality varies greatly among sub-bands, by adopting the system of the embodiment, the data transmission rate is improved, and thus the frequency spectrum utilization rate is greatly improved.

Apparently, those skilled in the art should appreciate that the respective modules and steps in the embodiments of the present disclosure can be realized using a general-purpose computing system; they can be integrated in a single computing system, or can be distributed on a network that consists of a plurality of computing systems. As an example, they can be implemented in program codes executable by a computing system so that they can be stored on a storage medium (ROM/RAM, magnetic disks, optical disks) and executed by the computing system; and in some cases, the steps shown or described may be performed in an order different than that described herein, or the respective modules or steps may be made into respective integrated circuit modules, or all or part of the modules or steps are implemented by being made into a single integrated circuit module. The present disclosure is not limited to any specific combination of hardware and software.

The above is a detailed description of embodiments of the present disclosure in conjunction with specific embodiments, but the present disclosure is not considered to be limited to these specific embodiments. Various simple deductions or substitutions may be made by those skilled in the art to which the disclosure pertains without departing from the concept of the disclosure, which deductions or substitutions should be considered as falling within the scope of the disclosure.

What is claimed is:

1. A wireless communication method, comprising:
receiving channel quality of a sub-band sent from a user equipment, the sub-band being a partial bandwidth divided from a system bandwidth;
determining a modulation and/or coding scheme adopted by the sub-band; and
sending indication information carrying the modulation and/or coding scheme to the user equipment,
wherein the method further comprises: dividing the system bandwidth into a plurality of sub-bands before receiving the channel quality of the sub-band sent from the user equipment, wherein number of the plurality of sub-bands is the same as number of sub-bands divided in a communication protocol, or the number of the plurality of sub-bands is determined according to system overheads.

2. The wireless communication method according to claim 1, further comprising: notifying, after dividing the system bandwidth into a plurality of sub-bands and before receiving the channel quality of the sub-band sent from the user equipment, the user equipment of a sub-band division mode and effective time of a sub-band division, wherein the sub-band division mode comprises number of divided sub-bands.

3. The wireless communication method according to claim 2, wherein the user equipment is notified of the sub-band division mode and the effective time of the sub-band division by means of a System Information Block, semi-persistent scheduling, or signalling.

4. The wireless communication method according to claim 1, wherein the indication information is sent to the user equipment in bits in downlink control information.

5. An evolved NodeB, comprising:
a processor; and
a memory configured to store executable instructions,
wherein the processor is configured to execute the executable instructions to perform the method according to claim 1.

6. The evolved NodeB according to claim 5, wherein the processor is further configured to execute the executable instructions to perform a step of:
notifying, after dividing the system bandwidth into a plurality of sub-bands and before receiving the channel quality of the sub-band sent from the user equipment, the user equipment of a sub-band division mode and effective time of a sub-band division, wherein the sub-band division mode comprises number of divided sub-bands.

7. The evolved NodeB according to claim 6, wherein the user equipment is notified of the sub-band division mode and the effective time of the sub-band division by means of a System Information Block, semi-persistent scheduling, or signalling.

8. The evolved NodeB according to claim 5, wherein the indication information is sent to the user equipment in bits in downlink control information.

9. A non-transitory computer storage medium storing a computer executable instruction therein, wherein the computer executable instruction is executed to perform the wireless communication method according to claim 1.

10. A wireless communication method, comprising:
measuring and calculating channel quality of a sub-band, and sending measurement and calculation results to an evolved NodeB, the sub-band being a partial bandwidth divided from a system bandwidth; and
receiving indication information carrying a modulation and/or coding scheme adopted by the sub-band sent from the evolved NodeB,
wherein the method further comprises: receiving a sub-band division mode and effective time of a sub-band division sent from the evolved NodeB before measuring and calculating the channel quality of the sub-band, wherein the sub-band division mode comprises number of divided sub-bands.

11. The wireless communication method according to claim 10, further comprising: after receiving the indication information sent from the evolved NodeB and according to the modulation and/or coding scheme adopted by the sub-band, demodulating downlink data on the sub-band, and sending uplink data on the sub-band.

12. The wireless communication method according to claim 11, wherein the indication information sent from the evolved NodeB is parsed according to agreed bits to obtain the modulation and/or coding scheme adopted by the sub-band.

13. A non-transitory computer storage medium storing a computer executable instruction therein, wherein the computer executable instruction is executed to perform the wireless communication method according to claim 10.

14. A user equipment, comprising:
a processor; and
a memory configured to store executable instructions,
wherein the processor is configured to execute the executable instructions to perform the method according to claim 10.

15. The user equipment according to claim 14, wherein the processor is further configured to execute the executable instructions to perform a step of:

controlling a response of the user equipment according to the effective time of the sub-band division.

16. The user equipment according to claim 14, wherein the processor is further configured to execute the executable instructions to perform steps of:
demodulating, after receiving the indication information sent from the evolved NodeB, downlink data on the sub-band according to the modulation and/or coding scheme adopted by the sub-band, and sending, after receiving the indication information sent from the evolved NodeB, uplink data on the sub-band according to the modulation and/or coding scheme adopted by the sub-band.

17. The user equipment according to claim 16, wherein the indication information sent from the evolved NodeB is parsed according to agreed bits to obtain the modulation and/or coding scheme adopted by the sub-band.

* * * * *